April 30, 1946.   E. H. SMOKER   2,399,514
PROCESS FOR DECOLORIZING LIGHT OIL FRACTIONS BY SELECTIVE HYDROGENATION
Filed Nov. 22, 1941
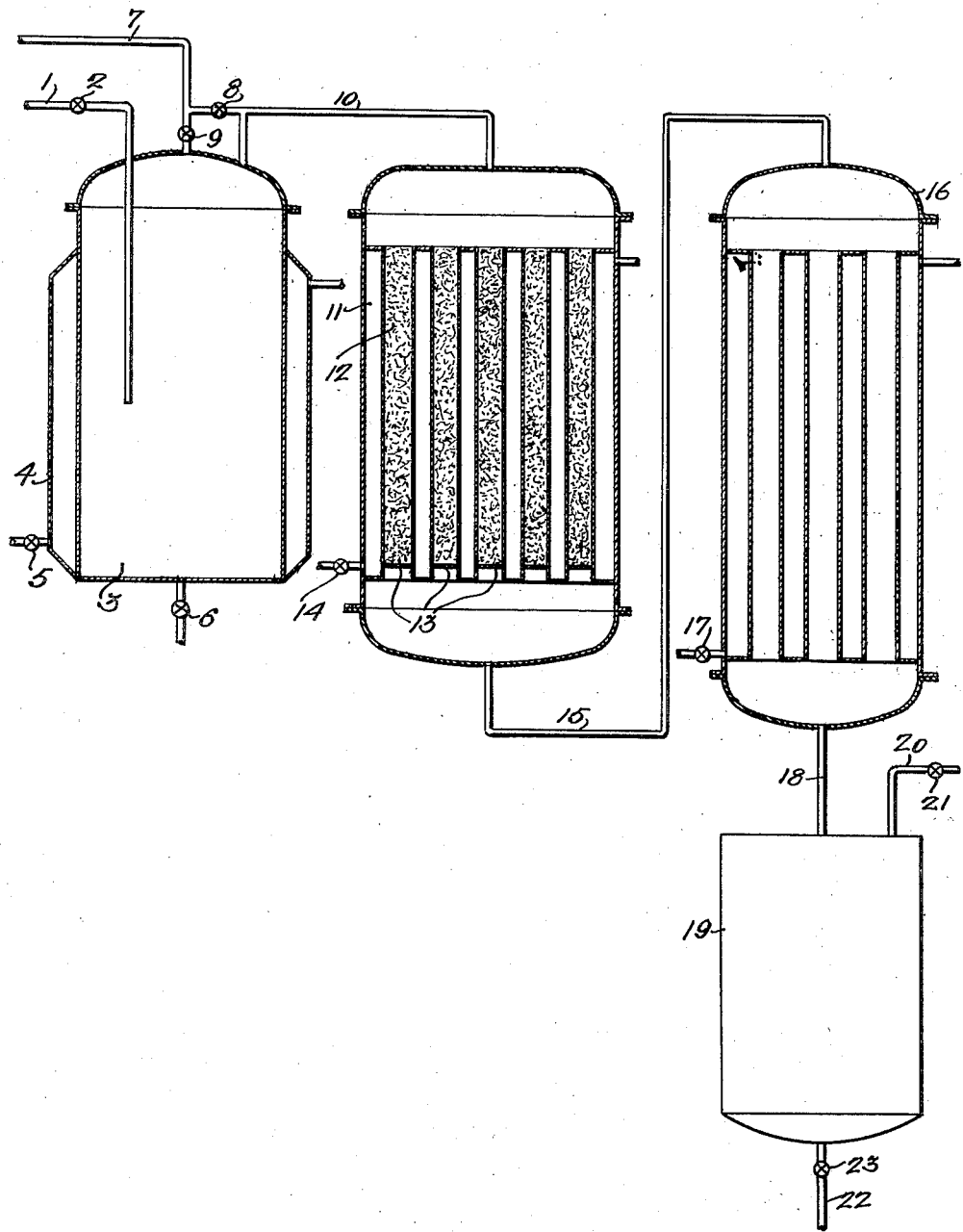
Inventor
Edward H. Smoker
By his Attorney
Hugo A. Kenman Patented Apr. 30, 1946

2,399,514

UNITED STATES PATENT OFFICE 2,399,514

PROCESS FOR DECOLORIZING LIGHT OIL FRACTIONS BY SELECTIVE HYDROGENATION

Edward H. Smoker, Drexel Hill, Pa., assignor to The United Gas Improvement Company, a corporation of Pennsylvania Application November 22, 1941, Serial No. 420,039

7 Claims. (Cl. 260—669)

This invention pertains generally to the purification of valuable resin-forming aromatic olefine hydrocarbons containing impurities such as aromatic acetylene hydrocarbons and/or color or color-forming bodies in admixture therewith.

The invention pertains more particularly to the purification of aromatic olefines for example fractions of aromatic olefines derived from light oil obtained in the manufacture of gas such as by the pyrolytic decomposition of carbonaceous material, such as crude oil, crude oil fractions, coal, and the like.

The invention pertains still more particularly to the purification of light oil fractions of aromatic olefines having present therein impurities such as aromatic acetylenes and/or color or color-forming bodies in amounts sufficient to impair or destroy the desirable properties of the resins obtained from said fractions, such as their toughness, light color, color-stability, electrical properties, melting point, etc.

For convenience, the invention will be described more particularly in connection with the purification of light oil styrene fractions obtained in the manufacture of combustible gas, although it is to be understood that other aromatic olefine containing materials may be similarly treated. Such other materials for example may include substituted styrenes in which the substituent group or groups may be alkyl, aryl, alkyl-aryl, or aryl-alkyl, and may be present (a) in the nucleus, such as ortho-, meta-, or para-methyl styrene; (b) in the side-chain, such as alpha- or beta-methyl styrene; or (c) in both the nucleus and the side-chain, such as beta-ethyl para-methyl styrene.

The general formula for such compounds may be represented by the following:

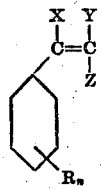

wherein X, Y and Z are selected from the class consisting of hydrogen, alkyl, aryl, alkyl-aryl, and aryl-alkyl radicals; R is selected from the class consisting of alkyl, aryl, alkyl-aryl and aryl-alkyl radicals; and $n$ is selected from the class consisting of numbers from 0 to 5.

The process of the present invention is applicable to all such compounds when contaminated with aromatic acetylenes and/or color or color-forming bodies. The aromatic acetylenes present as contaminants have the probable formula:

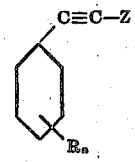

wherein R, Z and $n$ have the same meanings as before.

Impurities of the foregoing nature are extremely difficult to substantially completely remove from valuable aromatic olefines by ordinary methods such as distillation, inasmuch as they have boiling points very close to those of the valuable aromatic olefine hydrocarbons with which they are admixed and/or form azeotropic mixtures therewith. For instance, in the case of styrene its boiling point is only a few degrees above that of phenyl-acetylene.

It is an object of my invention to purify crude resin-forming hydrocarbons of the foregoing type by a method comprising a catalytic hydrogenation treatment thereof in the vapor phase.

It is a further object of my invention to provide a continuous process for the catalytic hydrogenation of undesirable impurities in such materials while in the vapor phase at an elevated temperature; said process being simple in operation, effective to substantially completely remove said undesirable impurities without at the same time converting or destroying any substantial portion of the desired resin-forming hydrocarbon content either by reduction or by polymerization, and without forming other undesirable by-products.

It is a still further object of my invention to provide a method for reactivating a hydrogenation catalyst at suitable intervals during the course of the hydrogenation purification process mentioned in the preceding paragraph.

Other and further objects of my invention will become apparent as the description proceeds.

In various processes for the manufacture of combustible gases, such as oil gas or carburetted water gas, considerable quantities of tar are produced, as well as substantial quantities of other readily condensible materials.

The non-tarry condensate as well as the components separated from the tar constitute a valuable source for styrene and other resin-forming unsaturated hydrocarbons.

Light oil from the source indicated may be subjected to fractional distillation, or otherwise suitably treated, to obtain cuts including light oil styrene fractions. For instance, a typical light oil styrene fraction obtained by ordinary distillation technique may contain approximately 50% styrene. While the invention is particularly applicable to dilute styrene solutions from this or other sources, it is to be understood that styrene solutions or light oil styrene fractions of any desired styrene content such as from 5% to 99.5%, or even higher, may be treated in accordance with the invention.

The crude fractions of light oil styrene may have any reasonable boiling range such as between 135° C. and 155° C. Crude styrene fractions with boiling ranges which do not greatly exceed 140° to 150° C. are more desirable.

Crude styrene fractions with boiling ranges within about 142° to 148° C. are preferred.

In practicing my invention, I find it highly desirable to concentrate the light oil by distillation, or other suitable means, to a styrene concentration of at least 30%.

I have discovered that styrene solutions, or light oil styrene fractions, such as of the nature described, may be subjected to catalytic hydrogenation under conditions such that little or none of its styrene content is converted to more highly saturated compounds, and under conditions such that undesirable concentrations of phenylacetylene and/or colored or color-forming bodies contained therein are converted or reduced to compounds which, unlike the original contaminants, do not adversely affect the properties of the resin produced from the styrene.

The nature of the colored or color-forming bodies is not fully known. Their presence may be due to any one or more of the following causes: (a) presence of material of highly complex and/or unsaturated nature, (b) presence of sulfur compounds, (c) oxidation of unsaturated light oil constituents, or (d) reaction between one or more of the components or impurities present in the light oil (said light oil being of extremely complex constitution) with metals, particularly copper or brass, ordinarily employed as materials of construction in fabricating chemical process equipment. Other causes not now known may also contribute to the presence of these undesirable colored or color-forming bodies.

For convenience, the term "color imparting bodies" will be employed in the specification and the claims to include either colored bodies or color forming bodies or both.

Light oil styrene fractions usually contain phenyl acetylene in varying proportions depending upon the conditions of pyrolysis, for example the phenyl acetylene content may vary from fractions of a percent up to 8% of the styrene content and higher.

For some uses, the phenyl acetylene content should be at least as low as 0.1% of the styrene content, while for others it should be at least as low as 0.01% of the styrene content and preferably lower.

I have reason to believe from experimental evidence that phenylacetylene present as an impurity in light oil styrene fractions is hydrogenated to styrene according to the equation:

$$C_6H_5.C \vdots CH + H_2 \rightarrow C_6H_5.CH:CH_2 \quad (I)$$

While the further hydrogenation of styrene as represented by one or both of the following equations:

$$C_6H_5.CH:CH_2 + H_2 \rightarrow C_6H_5.CH_2.CH_3 \quad (II)$$
$$C_6H_5.CH_2.CH_3 + 3H_2 \rightarrow C_6H_{11}.CH_2.CH_3 \quad (III)$$

is theoretically possible, I find by employing vapor phase hydrogenation as a continuous process with a suitable catalyst such as activated nickel, that the phenylacetylenic and/or color imparting bodies present may be reduced to mere traces while the styrene content of the light oil styrene fraction is not materially altered, and—a matter of great practical importance—that loss of styrene through heat polymerization during the purification step is negligible, ranging during a long series of runs from mere traces, if any, to a maximum of a few tenths of one per cent.

From the foregoing, it will be understood that my purification procedure may be regarded broadly as a partial, selective hydrogenation; selective, because it operates upon the phenylacetylene and/or color imparting bodies present to the substantial exclusion of the styrene, and partial, because it reduces the phenylacetylene largely to styrene only, and not to more highly unsaturated compounds.

CATALYST

A large variety of catalysts may be employed in the practice of my invention, among them being nickel, nickel oxide, various nickel salts, palladium, platinum, etc. Any hydrogenation catalyst which is capable of reducing phenylacetylene and/or color imparting bodies but which is not sufficiently active to reduce substantial amounts of the styrene itself under the conditions of reaction may be suitably employed. Preferably such catalysts are employed in the finely-divided form, thus giving a large active surface area.

The catalyst may be supported or not as desired, and may be admixed after formation thereof with the supporting material, or it may be deposited or formed thereon in situ, or otherwise.

Inert catalyst supports or carriers for example those of a siliceous nature such as pumice, kieselguhr, clay, fuller's earth, asbestos, etc., are especially useful for the purpose, although any other type of catalyst carrier may be employed.

I have discovered that an activated nickel catalyst prepared by reducing nickel oxide in a current of hydrogen at a temperature of approximately 270° to 280° C. is particularly satisfactory.

Such a catalyst may be prepared for instance as follows:

Pumice of any desired size such as 4-mesh was first cleaned by soaking in hot concentrated nitric acid and then washing thoroughly with hot distilled water.

Nickel oxide was prepared by impregnating 95 grams of the acid-treated pumice with a solution of 92 grams of nickel nitrate crystals $$(Ni(NO_3)_2.6H_2O)$$

in 150 cc. of water. The water was evaporated slowly with constant stirring and when dry the temperature was raised to decompose the nitrate, leaving a uniform deposit of black nickel oxide, mainly $Ni_2O_3$, on the surface of the pumice. The amount of oxide thus deposited was 17.5 grams, as determined by the increase in weight of the support. The supported oxide thus prepared was introduced into a reaction tube and there treated with hydrogen at an elevated temperature to produce the activated nickel catalyst in a manner to be described, prior to carrying out the catalytic hydrogenation according to the invention.

APPARATUS

While many forms of apparatus may be successfully employed in the practice of the invention, I have discovered that an arrangement of apparatus substantially as shown diagrammatically in the accompanying drawing possesses many advantages, including simplicity and ease of operation.

The unsaturated aromatic hydrocarbon, such as styrene, flows through line 1 into the flashing chamber 3, the rate of flow being controlled by means of valve 2, which can be adjusted automatically, if desired. The flashing chamber is provided with heating means, such as a heating jacket 4, through which steam (superheated or not) or other heating medium may be circulated. The rate of flow of such heating medium is controlled by means of valve 5. It is to be understood, of course, that other heating means, such as electrical heating units, may be employed for this purpose, if desired.

Any residues collecting in the flashing chamber may be removed at suitable intervals by means of the drain line and valve 6.

The hydrogen may be introduced into the unit by means of line 7, the line being divided in such a way as to permit the hydrogen to be introduced into the flashing chamber by means of valve 9 or into the vapor line 10 by means of valve 8. If desired, the hydrogen also can be introduced directly into the convertor 11.

If desired, also, the liquid aromatic olefine may be volatilized by passing it through a heated coil, or otherwise.

The volatilized aromatic olefine is charged to the convertor 11, together with the desired quantity of hydrogen. The convertor, which may be of the shell-and-tube type, contains one or, preferably, more catalyst tubes 12, the catalyst being held in place by means of perforated plates 13 at the bottom of each tube, or otherwise. The convertor is maintained at the desired temperature by circulating steam (superheated or not) or other heating medium through the shell around the tubes, the rate of flow of such heating medium being controlled by means of a valve 14, or otherwise. Other heating means may, of course, be used if desired.

The hydrogenated products are transferred by way of line 15, from the convertor to the condenser 16, which may conveniently be of the shell and tube type. The rate of flow of cooling water through the condenser is controlled by means of valve 17.

The condensed liquid products are transferred to a receiver 19 by way of line 18. The receiver 19 may be connected to a vacuum pump (not shown) by means of line 20 controlled by valve 21. The receiver 19 may be also provided with a drain line 22 controlled by valve 23. The apparatus as shown may be made of a wide variety of materials. For example, it may be constructed from one or more of the following construction materials: aluminum, nickel, zinc, tin, magnesium, lead, alloys of these metals substantially free from copper and iron, and stainless steel; reference being made to copending applications of Frank J. Soday, Serial No. 277,166, filed June 3, 1939, which has matured into Patent 2,297,724, granted October 6, 1942; Serial No. 265,940, filed April 4, 1939, which has matured into Patent 2,297,722, granted October 6, 1942; Serial No. 265,941, filed April 4, 1939, which has matured into Patent 2,297,723, granted October 6, 1942.

Having described one form of apparatus, purification procedure will now be described in connection therewith in the following example.

EXAMPLE 1

The convertor 11 was packed with pumice-supported nickel oxide prepared in the manner already described. The system was thoroughly purged with hydrogen in order to expel all air before heating the apparatus. A rapid stream of hydrogen was then passed through the apparatus while the temperature of the convertor was raised to 275° C.

Care was taken to exclude air from the entire system, not only during the preparation of the catalyst but also during the subsequent hydrogenation runs.

The temperature was maintained at 270°–280° C. for eight hours with hydrogen flowing through the catalyst mass at the rate of 250 cc. per minute.

After this period of time the coated pumice changed in color from black to dull gray, indicating reduction to activated metallic nickel. On the basis of 17.5 grams of $Ni_2O_3$ the weight of nickel deposited was 6.2 grams, or 6.5% of the weight of the carrier.

After the reduction of the oxide to metallic nickel the temperature and pressure were lowered to 150° C. and 40 mm. Hg absolute.

Without interrupting the flow of hydrogen, a charge of 200 grams of a styrene solution was introduced into the flashing chamber 3. This styrene was a light oil styrene fraction having the following physical properties:

| | |
|---|---|
| Density ($d\ 20°/4°$) | 0.8883 |
| Refractive index ($n\ 20°/D$) | 1.5236 |
| Styrene content (by bromine titration) percent | 51.5 |
| Phenylacetylene do | 1.44 |
| Color, Gardner scale | 1.2 |
| Color, Franz scale | 36 |

The Franz color scale is a very much more sensitive scale than the well known Gardner scale, and better adapted for the comparison of very low color intensities. In the Franz scale 27 units are approximately equivalent to 1 unit in the Gardner scale.

After introducing the styrene fraction into the flashing chamber 3, the temperature of the chamber was adjusted to permit the styrene to be vaporized at the desired rate. The entire charge distilled in three hours time. The product was redistilled at 44 mm. Hg absolute to give a purified material having a density ($d\ 20°/4°$) of 0.8900; a refractive index ($n\ 20°/D$) of 1.5247; a styrene content of 51.6%; a phenylacetylene content of 0.00%; a Franz scale color of 1; and a Gardner color of 0.

It will thus be seen that as a result of the treatment substantially all the undesirable color imparting bodies and all of the phenylacetylene were removed from the original light oil styrene fraction, while the styrene content thereof remained substantially the same.

EXAMPLE 2

Another run upon a second sample of the same starting material was made, using a charge of freshly reduced catalyst. The operating conditions were not greatly different than in the previous example except that a longer distillation period, namely six hours, and a somewhat longer time of control were employed. Upon redistillation of the product, there was obtained a material having a boiling range of 56°–60° C. at 38 mm. absolute; a density ($d$ 20°/4°) of 0.8894; a refractive index ($n$ 20°/D) of 1.5249; a styrene content of 50.2%; a phenylacetylene content of 0.00% and a Franz color of <1.

The runs of Examples 1 and 2 were made under the following operating conditions:

Table I

|  | Example 1 | Example 2 |
| --- | --- | --- |
| Temperature of catalyst mass..........°C.. | 150 | 150 |
| Contact time..........................sec.. | 0.24 | 0.32 |
| Hydrogen/crude styrene ratio, by weight.. | 0.02 | 0.04 |
| Hydrogen/100% styrene ratio, by weight.. | 0.04 | 0.08 |

In making the calculations for the last three values given in the preceding table, the diluent in the light oil styrene fraction was assumed to be xylene; the three isomeric xylenes constituting in fact the preponderant portion of the saturated aromatic hydrocarbon diluent content of the usual light oil styrene fraction. It was also assumed that the vapors follow the gas laws.

Contact time is calculated by dividing the volume of free space in the catalyst mass by the sum of the volumes of styrene vapor, hydrocarbon diluent vapor and hydrogen simultaneously passed through the catalyst per second at the temperature and pressure of reduction.

It is to be understood of course that any other equivalent method for the calculation of the above values might be employed.

Example 3

In this example the catalyst was prepared similarly to that described previously except that a solution of 150 grams of nickel nitrate crystals in 250 cc. of water was used to treat 150 grams of acid-treated 4-mesh pumice. 31 grams of black nickel oxide, $Ni_2O_3$, were deposited on the pumice. 119 grams of the supported oxide were packed into the reaction tube, and reduced in the manner already described to give 8.7 grams of activated nickel supported on the catalyst carrier.

Having reduced the nickel oxide to metallic nickel as described, the temperature was lowered to 150°–160° C. and with the flow of hydrogen uninterrupted, the pressure was reduced from atmospheric to 40 mm. A charge of 250 grams of a styrene solution was then introduced into the flashing chamber 3, this being a light oil styrene fraction have the following physical properties:

| | |
| --- | --- |
| Density ($d$ 20°/4°) | 0.8884 |
| Refractive index ($n$ 20°/D) | 1.5219 |
| Styrene ..........................per cent.. | 45.0 |
| Phenylacetylene ..........................do.... | 2.09 |
| Color, Gardner scale | 1.3 |
| Color, Franz scale | 39 |

The product obtained was water white in color and contained less than 0.00% of phenylacetylene. The Franz color was less than 1.

The series of runs were carried out under the following operating conditions.

Table II

|  | A[1] | B[1] | C[2] |
| --- | --- | --- | --- |
| Temperature of catalyst mass, °C.......... | 155 | 155 | 150 |
| Contact time, sec.[3].......................... | 0.20 | 0.22 | 0.25 |
| Hydrogen/crude styrene ratio, by weight..... | 0.045 | 0.042 | 0.064 |
| Hydrogen/100% styrene ratio, by weight..... | 0.095 | 0.094 | 0.129 |

[1] Crude (untreated) styrene having properties as defined above in Example 3.
[2] Represents the average of data from over a hundred runs upon crude styrene as in Example 3, and crude styrene having a slightly higher styrene content (48.4%) and a considerably lower phenylacetylene content (1.2%±0.09).
[3] Computed as before described.

In practically all cases the color and color-forming bodies were substantially completely removed and the phenyl acetylene was also substantially completely removed.

While I have obtained particularly good results when operating with contact times in the range of approximately 0.20 to 0.40 second, and hydrogen/100% styrene ratios of from approximately 0.05 to 0.130 (calculated in the manner above set forth or its equivalent), my invention is not limited to these ranges since its advantages may be realized, at least in part, when operating under conditions well outside these values.

Accordingly, contact times within the range of approximately 0.1 to 5.0 seconds, and hydrogen/100% styrene ratios within the range of approximately 0.01 to 0.5 may be readily employed.

Likewise the hydrogenation conditions of 150° C. and 40 mm. Hg specifically set forth in the examples are to be regarded as merely representative of a wide variety of conditions which may be employed with excellent results. Thus temperatures in the range of approximately 25° to 400° C. and above, and pressures ranging from subatmospheric to superatmospheric are suitable, it being only necessary to correlate the factors and particularly temperature and time of contact (having regard to the nature of the particular catalyst employed) so that relatively mild conditions of vapor-phase hydrogenation of the crude styrene-containing material may be obtained.

Reactivation of the Catalyst

While the hydrogenation catalysts—and particularly the activated nickel catalyst prepared as already described—possess a relatively long useful life when care is exercised to keep catalyst poisons out of the system in so far as is practicable, I prefer to subject the catalyst mass to a reactivation treatment from time to time to renew its activity.

Various methods may be employed to reactivate the catalyst mass. I have discovered that two particularly effective methods are (1) reduction at an elevated temperature in an atmosphere of hydrogen, and (2) oxidation with an oxygen-containing gas (for example, air) at an elevated temperature, followed by reduction with hydrogen at an elevated temperature.

Thus, under (1) above there may be employed a reduction treatment which includes heating the catalyst mass to a temperature of say 280° C. for a period of say 7 hours in an atmosphere of hydrogen. Under (2) the following alternatives are among those which have been found satisfactory: (a) oxidation with air at say 300° C. for say 3 hours and subsequent reduction with hydrogen at say 280° C. for say 5 hours; (b) oxidation with air at say 300° C. for 13 hours followed by reduction with hydrogen at 280° C. for say 12 hours; and (c) oxidation with air at say 400° C. for say 7 hours followed by reduction with hydrogen at say 280° C. for say 7 hours.

The last-named ordinarily represents the preferred procedure.

It will be obvious that the temperatures and times of heating specifically mentioned may be departed from considerably while still retaining the usefulness of the reactivation treatment upon any given catalyst material.

EFFECT OF THE HYDROGENATION PURIFICATION TREATMENT OF THE MONOMERIC MATERIAL UPON THE RESULTANT POLYMER

In order to determine the effect upon the resultant polymers of treating crude styrene according to the present invention representative samples of material treated by the continuous hydrogenation process were polymerized by sealing in glass bombs in an inert atmosphere such as nitrogen and heating to 100° C. for 10 days.

The comparative results are set forth in Table III below. Melting points were determined by the capillary method; toughness was rated on the basis of 0 to 5 the latter being the upper limit of the toughness scale and the former to lower limit; mold colors were based on a scale of 0 to 10.

Table III

|  | Sample number | | | |
| --- | --- | --- | --- | --- |
|  | [1]1 | [2]2 | [2]3 | [2]4 |
| Phenylacetylene...percent... | 1.2 | Negative | Negative | Slight trace. |
| Color of the monomeric material (Franz scale)..... | 150 | 14 | 26 | 22 |
| Yield of polymer based on charge............percent... | 31.0 | 39.5 | 49.2 | 45.3 |
| Yield of polymer based on unsaturates......percent... | 64.0 | 80.9 | 92.8 | 86.6 |
| Melting point of the polymer °C................... | 157 | 200 | 189 | 194 |
| Color of the molded polymer....................... | 7.0 | 0.9 | 1.0 | 0.3 |
| Toughness of the polymer... | [3]2 | [4]4.2 | [4]4.0 | [4]4.5 |

[1] Crude (untreated) styrene; styrene content 48.4%.
[2] Composite material comprising a number of cuts or fractions of treated styrene obtained by vapor-phase reduction with activated nickel catalyst at 150° C. and 40 mm. Hg absolute.
[3] Polymer prepared from untreated styrene fractured badly when molded.
[4] Polymer prepared from treated styrene molded satisfactorily.

These data clearly show the beneficial effect on the properties of the molded material when phenylacetylene and/or color imparting bodies have been largely or completely removed from styrene by my method of partial selective catalytic hydrogenation of the monomeric starting material.

The very substantially improved toughness and increased melting point as well as the reduced color render the polymers of greatly increased value.

The yield of polymer based upon the unsaturated content of the monomeric material is likewise considerably increased as a result of the treatment.

While various catalysts, and particularly an activated nickel catalyst, have been referred to, it is to be understood that the use of other hydrogenation catalysts in the practice of my invention is not precluded.

Also while one way of preparing a supported catalyst in situ by employing a particular nickel salt has been described, those skilled in the art will understand that other salts of nickel (or of other catalytically acting metals) might be employed, and that other means than heat (such as chemical precipitation, electrodeposition, etc.) might be employed to convert the metal salt into simpler compounds, suitable for catalytic purposes as such or preparatory to reduction with hydrogen or otherwise for activation to the final desired catalytic form.

For reduction and hydrogenation purposes chemically pure hydrogen is preferred, but other hydrogen might be employed. Thus hydrogen-containing gas mixtures of various types such as water gas—essentially a mixture of hydrogen and carbon monoxide usually with some nitrogen and carbon dioxide present—might be employed, provided care is taken to remove therefrom traces of catalyst poisons such as sulfur and/or its compounds. Catalyst poisons from any source whatsoever are of course to be avoided.

If desired, and particularly when employing hydrogen in pure or highly concentrated form, hydrogen passing through the system unreacted may be recovered such as by recycling same to the feed end of the apparatus.

The process may be operated batchwise, intermittently, or on a continuous or continual basis, as desired.

The reactants may be charged separately and/or directly to the reaction tube if desired; the crude styrene material being in the form either of a liquid or a vapor when charged. If a liquid, vaporization may occur directly in the reaction zone; in this case it may be desirable to provide an additional preheating or vaporizing zone in the reaction tube ahead of the catalyst mass.

Charging the crude styrene in the manner shown in the drawing however possesses the advantage of permitting the styrene to be vaporized at relatively low temperatures, due to the partial pressure effect of the added hydrogen. It also combines my novel hydrogenation treatment with a distillation step which would ordinarily be employed in any event where particularly high quality monomeric resin-forming hydrocarbons are desired to be produced. Furthermore, any relatively small amount of polymer which might be formed during the vaporization of the charge stock is left behind in the flashing chamber, and does not carry over into the hydrogenator to thereby contaminate the purified product.

While reference has been made to the treatment of aromatic olefine fractions derived from light oil obtained in the manufacture of combustible gas by the pyrolysis of petroleum oil which is preferred, any other aromatic olefine material containing acetylenic impurities and/or color imparting bodies which it is desired to remove may be similarly treated. Thus, besides oil gas light oil fractions and carburetted water gas light oil fractions, there may be mentioned coal tar light oil fractions and fractions obtained in oil refinery cracking operations generally. Aromatic olefines derived from synthetic sources, such as styrene from the dehydrogenation of ethyl benzene, may also be treated in accordance with my invention should they be found to contain undesirable impurities such as acetylenic compounds or color imparting bodies.

Besides the saturated aromatic hydrocarbon diluent or diluents normally present in light oil fractions for which the invention is especially applicable, other diluents of a hydrocarbon nature or otherwise may be present or added if desired.

Examples of such diluents are aromatic hydrocarbons such as benzene, toluene, xylene, solvent naphtha and the like, and aliphatic and/or naphthenic hydrocarbons or hydrocarbon fractions.

It will be understood that the invention is by no means limited to the treatment of material containing both types of impurities mentioned above but in fact may be applied with advantage when either type of impurity is present to the substantial exclusion of the other.

In all cases, care is preferably taken to exclude air from the hydrogenator during the preparation of the reduced nickel catalyst and during the hydrogenation treatment proper.

It is to be understood that the foregoing is by way of illustration and that changes, omissions, additions, substitutions and/or modifications might be made within the scope of the claims without departing from the spirit of the invention.

I claim:

1. A process for purifying a colored light oil styrene fraction contaminated with up to 8% by weight of the styrene content thereof of phenyl acetylene and containing color imparting material normally associated with styrene in a light oil fraction which comprises vaporizing said light oil styrene fraction, contacting the resulting vapors in admixture with hydrogen with a heated hydrogenation catalyst, passing the resulting products through a condensing zone and collecting a substantially colorless light oil fraction containing at least substantially the original quantity of styrene and substantially free of phenyl acetylene.

2. A process for decolorizing a light oil styrene fraction contaminated with color imparting material normally associated with styrene in a light oil fraction which comprises vaporizing said light oil styrene fraction, contacting the resulting vapors in admixture with hydrogen with a heated hydrogenation catalyst, passing the resulting products through a condensing zone and collecting a substantially colorless light oil fraction containing at least substantially the original quantity of styrene.

3. In a process for decolorizing a light oil aromatic olefine fraction contaminated with color imparting material normally associated therewith, the steps which comprise vaporizing said fraction, and contacting the resulting vapors in admixture with hydrogen with a heated hydrogenation catalyst to remove color imparting material therefrom.

4. In a process for decolorizing a light oil aromatic olefine fraction contaminated with color imparting material normally associated therewith, the steps which comprise vaporizing said fraction, and contacting the resulting vapors in admixture with hydrogen with heated activated nickel to remove color imparting material therefrom.

5. A process for decolorizing a light oil nuclearly substituted methyl styrene fraction contaminated with color imparting material normally associated therewith, which comprises vaporizing said fraction, contacting the resulting vapors in admixture with hydrogen with a heated hydrogenation catalyst, passing the resulting products through a condensing zone, and collecting a substantially colorless fraction containing at least substantially the original quantity of nuclearly substituted methyl styrene.

6. In a process for decolorizing a light oil styrene fraction contaminated with color imparting material normally associated therewith, the steps which comprise vaporizing said fraction, and contacting the resulting vapors in admixture with hydrogen with heated activated nickel to remove color imparting material therefrom.

7. In a process for decolorizing a light oil nuclearly substituted methyl styrene fraction contaminated with color imparting material normally associated therewith, the steps which comprise vaporizing said fraction, and contacting the resulting vapors in admixture with hydrogen with heated activated nickel to remove color imparting material therefrom.

EDWARD H. SMOKER.